US008862979B2

(12) United States Patent
Hawking

(10) Patent No.: US 8,862,979 B2
(45) Date of Patent: Oct. 14, 2014

(54) MULTI-CLIENT COLLABORATION TO ACCESS AND UPDATE STRUCTURED DATA ELEMENTS

(75) Inventor: Robert G Hawking, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1107 days.

(21) Appl. No.: 12/014,727

(22) Filed: Jan. 15, 2008

(65) Prior Publication Data
US 2009/0182763 A1 Jul. 16, 2009

(51) Int. Cl.
G06F 3/00 (2006.01)
G06F 17/30 (2006.01)

(52) U.S. Cl.
CPC ............... *G06F 17/30165* (2013.01)
USPC .......................................... 715/212

(58) Field of Classification Search
USPC ................... 715/212, 234, 243, 254
See application file for complete search history.

(56) References Cited

U.S. PATENT DOCUMENTS

| 5,884,325 | A | 3/1999 | Bauer et al. |
| 6,009,266 | A | 12/1999 | Brownell et al. |
| 6,640,234 | B1 * | 10/2003 | Coffen et al. ............ 715/219 |
| 6,681,225 | B1 | 1/2004 | Uceda-Sosa et al. |
| 6,988,241 | B1 | 1/2006 | Guttman et al. |
| 7,225,189 | B1 | 5/2007 | McCormack et al. |
| 7,233,951 | B1 | 6/2007 | Gainer et al. |
| 2002/0010743 | A1 | 1/2002 | Ryan et al. |
| 2002/0129054 | A1 | 9/2002 | Ferguson et al. |
| 2003/0065527 | A1 * | 4/2003 | Yeh et al. ............ 705/1 |
| 2004/0098546 | A1 | 5/2004 | Bashant et al. |
| 2005/0015379 | A1 | 1/2005 | Aureglia et al. |
| 2005/0267949 | A1 | 12/2005 | Scott, III |
| 2006/0053380 | A1 | 3/2006 | Spataro et al. |
| 2006/0129809 | A1 | 6/2006 | Battagin et al. |

(Continued)

FOREIGN PATENT DOCUMENTS

| JP | 06-250907 A | 9/1994 |
| JP | 09-146815 A | 6/1997 |

(Continued)

OTHER PUBLICATIONS

Xia et al. "A Collaborative Table Editing Technique Based on Transparent Adaptation," 2005.*

(Continued)

*Primary Examiner* — Kyle Stork
(74) *Attorney, Agent, or Firm* — Damon Rieth; Jim Ross; Micky Minhas

(57) ABSTRACT

Tools and techniques for providing multi-client collaboration to access and update structured data elements are disclosed. Client systems may present user interfaces that provide libraries of published data elements that are available for collaboration. The clients may request selected data elements, while referencing unique identifiers associated with the selected data elements. Those clients that publish data elements for collaboration by others may present user interfaces that provide representations of candidate structured data elements, and receive selections of those data elements chosen for publication. The publishing clients may then send the selected data elements for publication. The client systems may interact with servers or collaboration services, which may receive structured data elements that the clients have published for access by others. The servers may define respective unique identifiers for the published data elements, and may send the structured data elements and corresponding unique identifiers to various client systems.

15 Claims, 7 Drawing Sheets

(56) References Cited

U.S. PATENT DOCUMENTS

| | | | |
|---|---|---|---|
| 2007/0067257 | A1 | 3/2007 | Chen et al. |
| 2007/0083572 | A1 | 4/2007 | Bland et al. |
| 2007/0094601 | A1 | 4/2007 | Greenberg et al. |
| 2007/0100834 | A1 | 5/2007 | Landry et al. |
| 2007/0130503 | A1 | 6/2007 | Voshell |
| 2007/0143674 | A1* | 6/2007 | Daos et al. .................... 715/530 |
| 2007/0198952 | A1 | 8/2007 | Pittenger |
| 2007/0220415 | A1 | 9/2007 | Cheng et al. |
| 2007/0233811 | A1* | 10/2007 | Rochelle et al. .............. 709/219 |
| 2007/0294266 | A1* | 12/2007 | Chowdhary et al. .......... 707/100 |
| 2008/0077628 | A1 | 3/2008 | Gonzalez et al. |

FOREIGN PATENT DOCUMENTS

| | | |
|---|---|---|
| JP | 09-269912 A | 10/1997 |
| JP | 10-287175 A | 10/1998 |
| JP | 2002-297428 A | 10/2002 |
| JP | 2006-092519 A | 4/2006 |
| JP | 2007-094572 A | 4/2007 |
| RU | 2005134203 | 5/2007 |
| WO | WO 94/24629 | 10/1994 |
| WO | WO 01/93103 | 12/2001 |

OTHER PUBLICATIONS

"Edit Grid", 2000-2006, salesforce.com, inc., pp. 2.

Berlin, et al., "A Collaborative Table Editing Technique Based on Transparent Adaptation", vol. 3760, 2005, pp. 2.

"Shared Spaces . . . the Collaboration Advisor", retrieved at <<http://www.shared-spaces.com/blog/2005/02/advanced_realit.html>>, pp. 3.

International Search Report dated Jul. 28, 2009 in International Application No. PCT/US2008/088347.

"Edit Grid", downloaded Oct. 23, 2007 from http://www.salesforce.com/web-common/assets/doccache/MultiForceDir/01530000000FmZHAA0.pdf, salesforce.com, inc., pp. 2.

"Shared Spaces . . . The Collaboration Advisor", downloaded Oct. 24, 2007 from http://www.shared-spaces.com/blog/2005/02/advanced_realil.html, pp. 3.

Xia, et al., "A Collaborative Table Editing Technique Based on Transparent Adaptation", 2005 Lecture Notes in Computer Science, vol. 3760/2005, pp. 2.

Mexican Official Action dated Jun. 6, 2011 in Mexican Patent Application No. MX/a/2010/007397.

Chinese Official Action dated Dec. 19, 2011 in Chinese Application No. 200880125027.6.

Russian Official Action dated Dec. 20, 2012 in Russian Application No. 2010129240.

Australian Official Action dated Feb. 11, 2013 in Australian Application No. 2008348060.

Australian Official Action dated Mar. 21, 2013 in Australian Application No. 2008348060.

Japanese Official Action dated Apr. 5, 2013 in Japanese Application No. 2010-543112.

Russian Notice of Allowance dated Jul. 26, 2013 in Russian Application No. 2010129240.

Japanese Official Action dated Jul. 27, 2012 in Japanese Application No. 2010-543112.

\* cited by examiner

MULTI-CLIENT COLLABORATION TO ACCESS AND UPDATE STRUCTURED DATA ELEMENTS

BACKGROUND

For a variety of reasons, users of computing systems and applications are becoming more geographically separated or distributed from one another. Despite such distance or separation, these users may wish to collaborate on various projects on which they may be working. Different applications and utilities may support collaboration to some degree; however, further developments and improvements in this area are ongoing.

SUMMARY

Tools and techniques for providing multi-client collaboration to access and update structured data elements are disclosed. Client systems ("clients") may present user interfaces that provide libraries of published data elements that are available for collaboration. The clients may request selected data elements, while referencing unique identifiers associated with the selected data elements. Those clients that publish data elements for collaboration by others may present user interfaces that provide representations of candidate structured data elements, and receive selections of those data elements chosen for publication. The publishing clients may then send the selected data elements for publication. The client systems may interact with servers or collaboration services, which may receive structured data elements that the clients have published for access by others. The servers may define respective unique identifiers for the published data elements, and may send the structured data elements and corresponding unique identifiers to various client systems.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
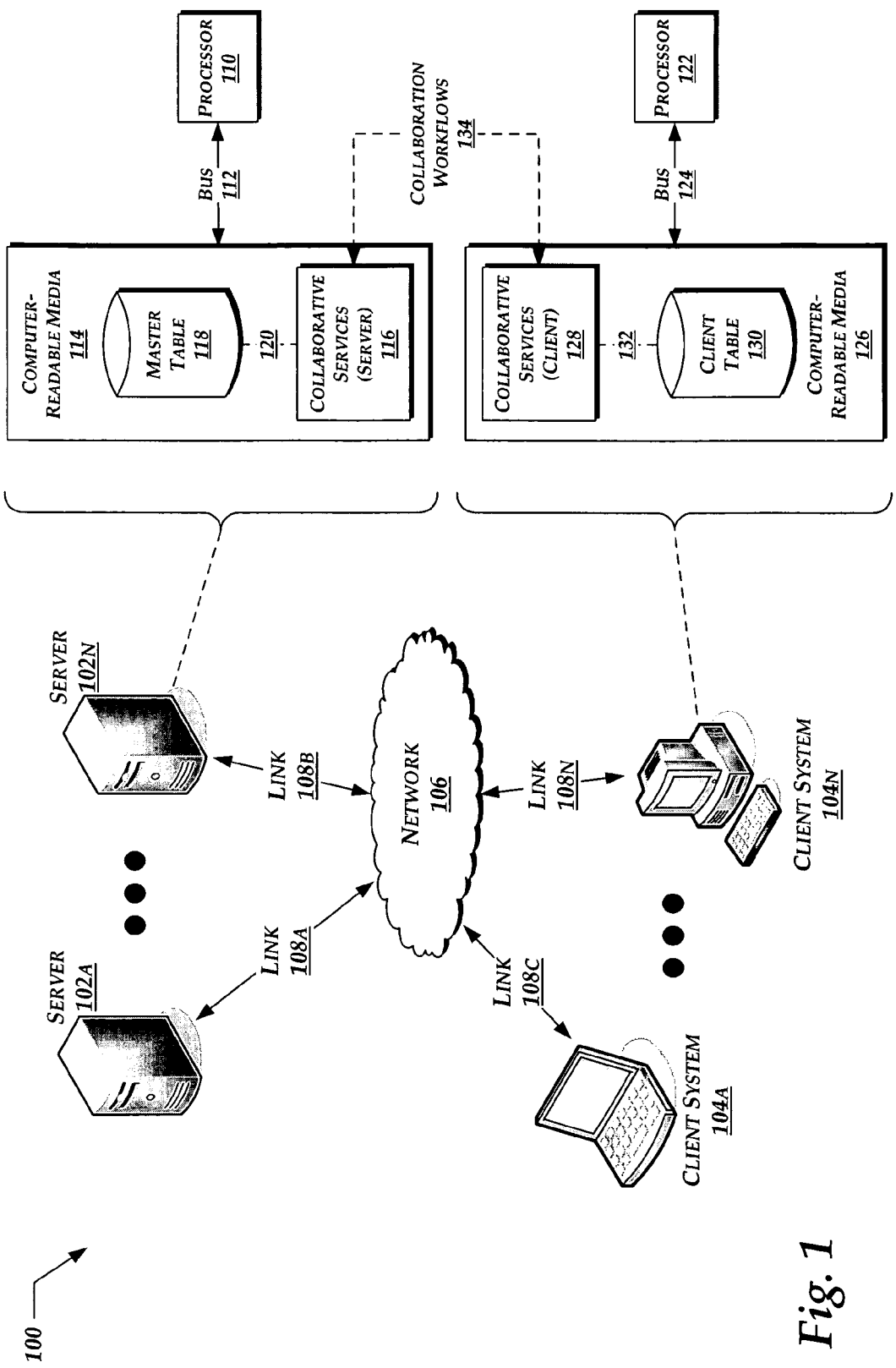
FIG. 1 is a block diagram, illustrating systems or operating environments that enable multi-client collaboration to access and update structured data elements.

The following detailed description is directed to technologies for enabling multi-client collaboration to access and update structured data elements. The term "structured data elements" is used herein, without limiting possible implementations, to refer to data elements that occur within the context of an overall organizational scheme. For example, such organizational schemes may be implemented within spreadsheets, or components thereof. These spreadsheet components may include workbooks, tables, rows, columns, cells, or portions thereof. Without limiting possible implementations, and only to facilitate this description, the following hierarchy is presented with reference to illustrative spreadsheet terminology:

| Example Spreadsheet Term | Generalization | Illustrative Role |
|---|---|---|
| Workbook | Model, Report, or Application | Provides a context in which a Table may operate. Formulas may refer to the Table. Within a Master Table, formulas within the Master Table may refer to other data in the Workbook that is not actually in the Master Table itself |
| Table | Data collaboration structure | Users may collaborate on the same Table, while different users may have different Workbooks. The description herein may enable collaboration between users at the Table level. |
| RowId, Column | Data point identifier | Identifies data points so that changes to a Table are applied to the same logical Cell/Data point in different Workbooks maintained by different users. |
| Cell | Data point | An individual value of data. |

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for multi-client collaboration to access and update structured data elements will be described.

FIG. 1 illustrates systems or operating environments, denoted generally at 100, that enable multiple client systems to collaboratively access and update structured data elements. These systems 100 may include one or more server systems 102, with FIG. 1 providing two examples of servers at 102a and 102n (collectively, servers 102). However, implementations of the description herein may include any number of servers.

The servers 102 may communicate with one or more client systems 104, with FIG. 1 providing two examples of the client systems as denoted at 104a and 104n (collectively, client systems 104). The server and client systems may communicate with one another over one or more networks 106, which may represent local-area or wide-area networks constructed using any appropriate networking and signaling technologies. The network 106 may include, for example, the Internet. These networks may provide wireless and/or wired communication capabilities.

The servers and the clients may communicate with the networks 106 via suitable links 108. FIG. 1 illustrates links 108a, 108b, 108c, and 108n, associated respectively with the servers 102a and 102n and the clients 104a and 104n. These links 108 represent hardware and/or software components that enable the servers and client systems to connect to the networks. These components may include network adapters, protocol stacks, and the like.

The graphical elements used in FIG. 1 to depict the servers, client systems, and networks are chosen only to facilitate illustration, and not to limit possible implementations of the description herein. More particularly, FIG. 1 shows examples in which the client system 104a is a portable computing system, whether characterized as a laptop, notebook, or other mobile system. The client system 104n represents a stationary or desktop system. However, the description herein also contemplates other forms of client systems, including but not limited to wireless personal digital assistants, smartphones, or the like.

Turning to the servers 102 in more detail, the servers may include one or more processors 110, which may have a particular type or architecture, chosen as appropriate for particular implementations. The processors 110 may couple to one or more bus systems 112 that are chosen for compatibility with the processors 110.

The servers 102 may include one or more instances of computer-readable storage media 114, which couple to the bus systems 112. The bus systems may enable the processors 110 to read code and/or data to/from the computer-readable storage media 114. The media 114 may represent storage elements implemented using any suitable technology, including but not limited to semiconductors, magnetic materials, optics, or the like. The media 114 may include memory components, whether classified as RAM, ROM, flash, or other types, and may also represent hard disk drives.

The storage media 114 may include one or more modules 116 of instructions that, when loaded into the processor 110 and executed, cause the server 102 to provide a set of services to the client systems that enable multi-client collaboration to access and update structured data elements. As detailed throughout this description, these server-side collaborative services may enable one or more users (shown in later drawings) at the client systems to access structured data stored within a master table 118. This description provides examples relating to structured data in the context of spreadsheet applications, but the principles described herein may extend to other applications without departing from the scope and spirit of the description herein. In general, the collaborative services modules 116 manage access and data transfers to and from the master table 118, as denoted by the dashed line 120.

Turning to the client systems 104 in more detail, the client systems may include one or more processors 122. These processors may be chosen as appropriate for the client systems, and may or may not have the same type or architecture as the processors 110 within the servers. The processors 122 may couple to one or more bus systems 124 that are chosen for compatibility with the processors 122, and thus may or may not be the same type or architecture as the bus systems 112 within the servers.

The client systems may include one or more instances of computer-readable storage media 126, which are coupled to the bus systems 124. The bus systems 124 may enable the processors 122 to read code and/or data to/from the computer-readable storage media 126. The general descriptions of the storage media 114 apply generally to the storage media 126, and thus are not repeated here.

The storage media 126 may include one or more modules 128 of instructions that, when loaded into the processor 122 and executed, cause the client systems 102 to participate with the server-side modules 116 to provide the collaborative services. As detailed throughout this description, these client-side collaborative services may enable users of the client systems to load structured data from the master table 118 into a client-side, or local, table 130. In general, the collaborative services modules 128 manage access and data transfers to and from the client table 130, as denoted by the dashed line 132.

As illustrated in FIG. 1, the server-side services 116 and the client-side services 128 may cooperate to enable workflows to pass between the servers and the client systems, as represented generally by the dashed line 134. The subsequent drawings and description elaborate further on the collaboration workflows 134, but these workflows generally represent command flows, data flows, and other processing related to the client systems 104 (and associated users) collaborating on structured data hosted at the servers 102.

While FIG. 1 elaborates on the components of the server 102n and the client system 104n, these descriptions may apply equally to the server 102a and to the client system 104a. These descriptions may also apply to servers or client systems not shown in FIG. 1, but may be included in implementations of the technologies provided herein.

While FIG. 1 shows example implementations that include server systems and client systems, it is noted that other implementations are possible. For example, functionality described herein as performed by the servers may be distributed to the clients. More specifically, the clients may include services that communicate with other clients, to perform the server functions described herein. In this manner, the server functions may be decentralized and distributed to the clients themselves.

Figure 2:
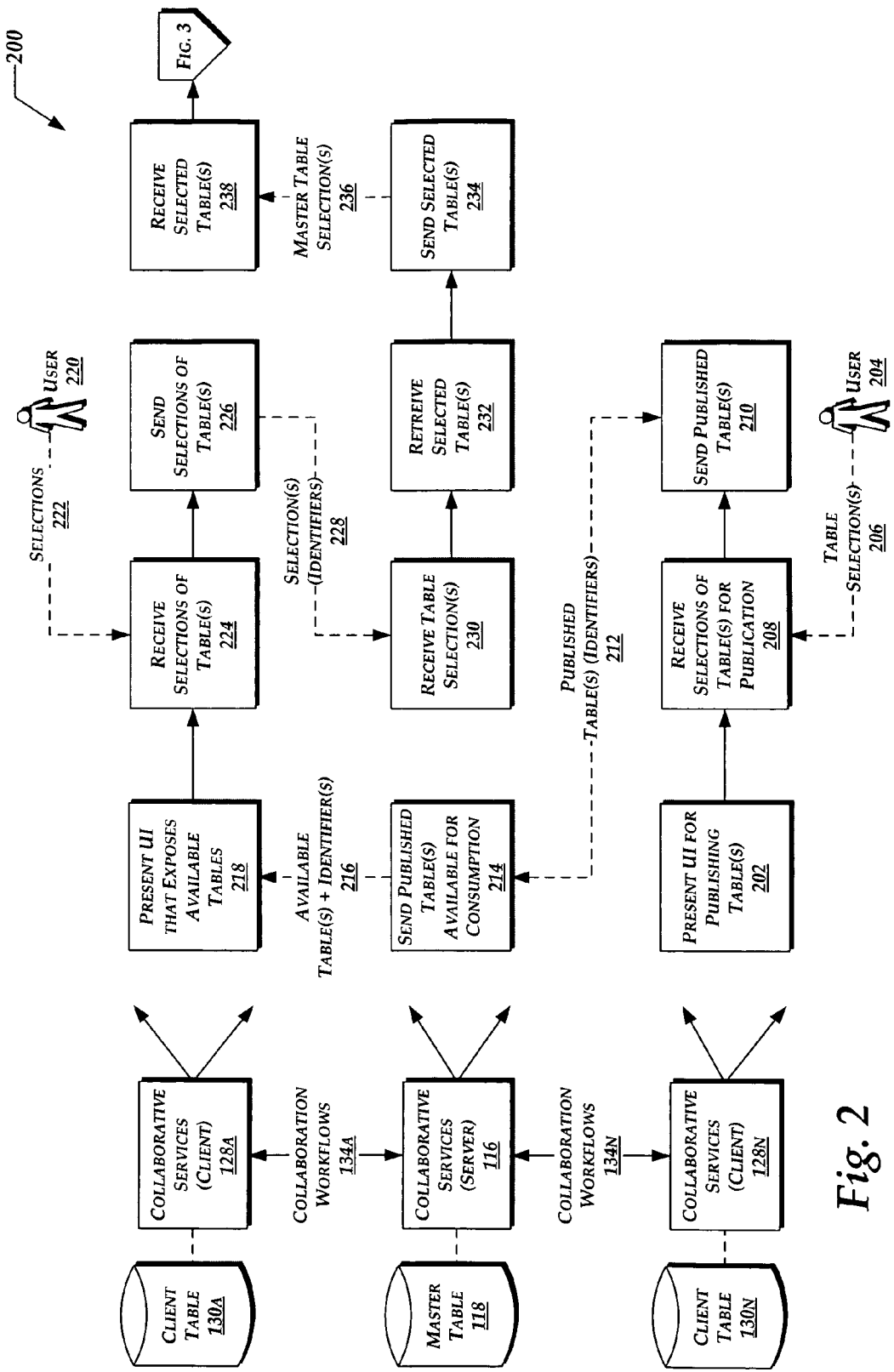
FIG. 2 is a combined block, data, and flow diagram of processes for enabling collaborating client systems to access structured master data from a server.

Having described the systems or operating environments 100 as shown in FIG. 1, the discussion proceeds to descriptions of process and data flows related to multi-client collaboration to access and update structured data elements, now presented in FIG. 2. In particular, FIG. 2 illustrates process and data flows, denoted generally at 200, for enabling client systems to collaboratively access structured master data from a server. For ease of description, but not to limit possible implementations, FIG. 2 may carry forward reference numbers from previous drawings, to refer to similar elements.

FIG. 2 carries forward examples of the client tables 130, with an example client table 130a associated with the client system 104a from FIG. 1, and an example client table 130n associated with the client system 104n. FIG. 2 also carries forward an example master table 118 associated with the server 102. Respective instances of the client-side collaborative services 128a and 128n manage the client tables 130a and 130n, and the server-side collaborative services 116 manage the master table 118. FIG. 2 also provides instances of the collaboration workflows 134, with workflows 134a passing to/from the client-side collaborative service 128a and workflows 134n passing to/from the client-side collaborative service 128n. As understood from viewing FIG. 2, the various data flows shown in FIG. 2 elaborate further on the collaboration workflows 134a and 134n.

Turning to the process and data flows 200 in more detail, block 202 represents a client system (e.g., the client system 104n associated with the client-side service 128n) presenting a user-interface (UI) that enables a user to request that one or more structured data elements be published from the client system to the server. Examples of such structured data elements may include tables, which represent collections of data structures arranged in rows and columns, with cells defined at the intersections thereof. These cells may contain data, formulas, or labels, as chosen or programmed by users. Block 202 may include presenting the UI in response to an explicit user command, or may include presenting the UI automatically in response to some set of conditions.

In response to the UI presented in block 202, a user 204 may select one or more tables for publication. For example, the user may have programmed a plurality of different tables or worksheets to perform different functions, and may select one or more of these tables or worksheets for publication, to enable other users to collaborate in working with these tables or worksheets. The user may choose to publish multiple tables out of the same workbook. The user may select entire tables or worksheets for publication, or may select portions thereof. FIG. 2 denotes such table selections at 206, and processing block 208 represents receiving these selections 206. For example, block 208 may include receiving indications of mouse clicks, selections, or other responses from the user, as represented in appropriate signals and/or events, as conveyed by hardware and/or software.

Block 210 represents sending or transmitting the tables that the user selected for publication. FIG. 2 denotes these selected tables at 212. While not explicitly shown in FIG. 2, the blocks 202, 208, and 210 may be repeated any number of times, to enable users to select multiple instances of structured data for publication to other users.

At the server associated with the server-side service 116, block 214 represents sending notifications to one or more client systems that the tables (e.g., 212) have been published, and are available for consumption. Without limiting possible implementations, the term "publication" as used herein may refer to placing the table into a common pool or library, where any number of other clients (and/or corresponding users) may browse through these published tables, and select one or more of these tables for collaboration. In implementations, this pool or library of published tables may be open-ended, in the sense that an indefinite number of clients or users may access the library and obtain shared copies of the tables for collaboration. When a given client publishes a table, that client may not know which other clients will ultimately share the published table.

FIG. 2 denotes notifications of available tables at 216, and these tables 216 may include the tables 212 as published by the client services 128n, as well as other tables published by other client services and related client systems. The available tables 216 may be organized into a library, which may contain entries for the various tables that have been published.

The server systems and the client systems may define one or more protocols that organize the set of candidate data elements (e.g., tables, data collaboration structures, or any portions thereof, as shown in the example hierarchical structure provided above) that are available for selection by the client systems. These protocols may identify which of these candidate data elements have been selected by particular client systems. For example, these protocols may organize the candidate data elements, and may associate a unique identifier with respective ones of the candidate data elements. For ease of reference herein, but not to limit possible implementations, this description refers to respective, unique data point identifiers that are associated with these candidate data elements. Thus, block 214 may include associating respective instances of these identifiers with elements within the available tables 216 that are published from the server systems to the client systems. The collaboration services 128 and 116 maintain these identifiers invisibly to the users, unless the users explicitly choose to see the identifiers. In addition, the collaboration services 128n associated with the publishing or contributing client may receive the identifiers associated with those tables published or contributed by the particular client, to facilitate later tracking and reconciliation of changes to these published or contributed tables.

At the other client system (e.g., 104a) associated with the client-side service 128a, block 218 represents presenting a UI that exposes the tables, workbooks, or other structured data elements that have been published by other clients, and are thus available for consumption by the client system 104a. A user 220 associated with the client system 104a may review the UI, and select one or more of the available structured data elements presented in the UI. FIG. 2 denotes these selections at 222.

In turn, block 224 represents the client services module 128a receiving selections of the structured data elements (e.g., tables, worksheets, rows, columns, or other constructs of such structured data elements) from the user. For example, block 224 (like block 208 above) may include receiving indications of mouse clicks, selections, or other responses from the user, as represented in appropriate signals and/or events, as conveyed by hardware and/or software.

Block 226 represents the client system sending indications of which tables the user has selected. After the user selects one or more of these available tables, block 226 may notify the server systems which tables or data elements the user selected, as denoted at 228. These notifications or indications 228 may include the identifiers of the selected data elements, as shown in FIG. 2.

At the server systems that maintain the master tables 118, block 230 represents receiving the selections 228 from the client systems. As noted above, the selections 228 may reference one or more identifiers corresponding to the selected data elements. In turn, block 232 represents retrieving the selected data elements from the master table (e.g., 118). Block 232 may include using the input identifiers included in the selections 228 as indices into the master table. Block 234 represents sending the selected data elements to the client system that requested these data elements. FIG. 2 denotes these transmitted data elements at 236.

At the client systems, block 238 represents receiving the requested data elements that the user previously selected (i.e., the selections 222). FIG. 2 illustrates an example in which a client table 130a receives data elements published from another client table 130n. However, it is noted that any number of client tables may request and receive data elements published from this client table 130n, as now illustrated in FIG. 3. In addition, any number of client tables may publish data elements to collaborate with other users.

Figure 3:
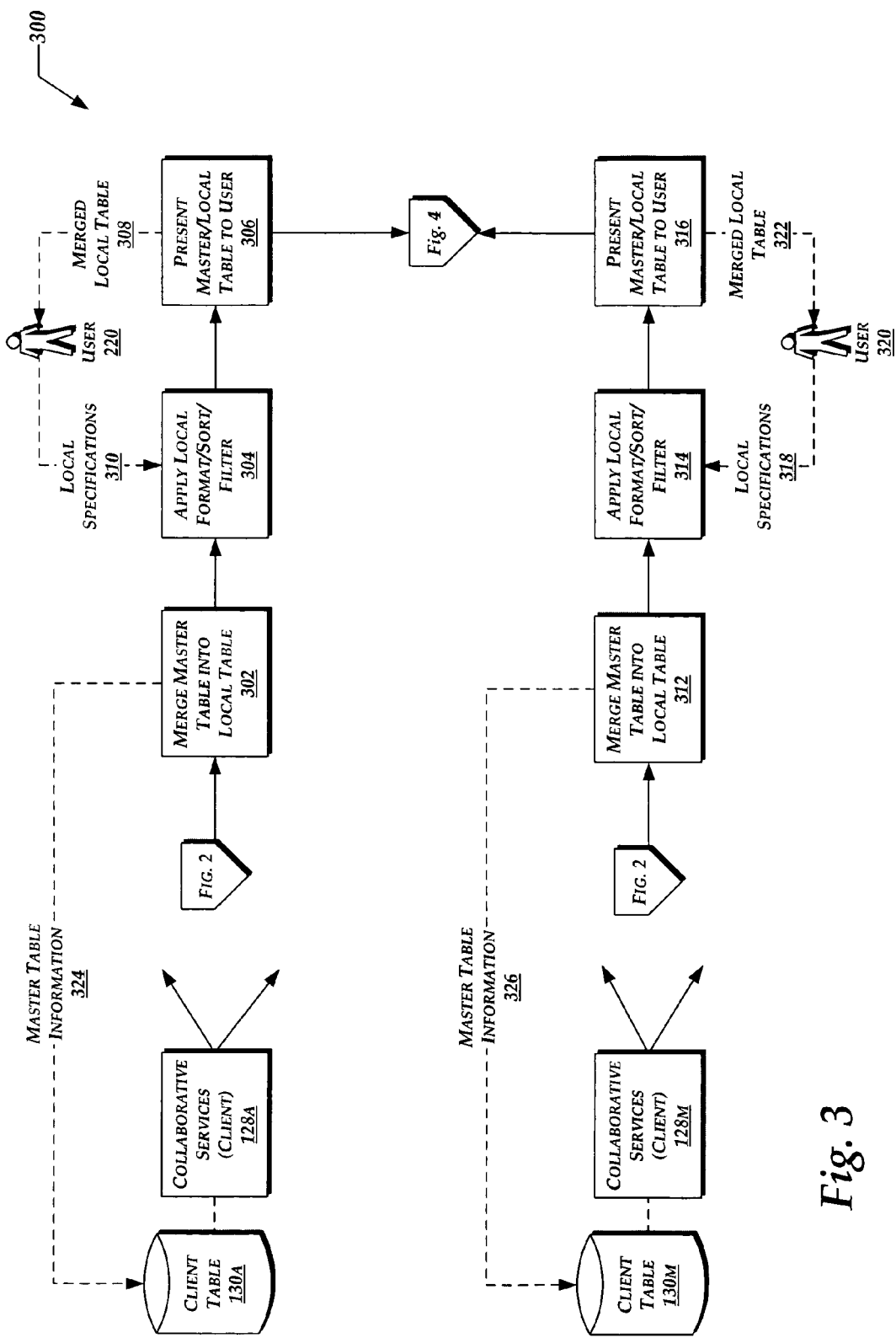
FIG. 3 is a combined block, data, and flow diagram of processes for enabling the client systems to apply local specifications to the structured data elements.

For clarity of description, but not limitation, the description of the process and data flows 200 continue to FIG. 3, as indicated by the off-page reference appearing in FIG. 2. The discussion now proceeds to FIG. 3 to continue with the description.

FIG. 3 illustrates process and data flows, denoted generally at 300, for enabling client systems to apply local formatting to structured master data received from a server. For ease of description, but not to limit possible implementations, FIG. 3 may carry forward reference numbers from previous drawings, to refer to similar elements.

As shown in FIG. 3, the client table 130a is carried forward from FIG. 2. FIG. 3 also provides another client table 130m maintained by another client system, assuming that this other client system has also requested and received one or more data elements from the server system. FIG. 3 illustrates client-side collaborative services 128m, which maintains the client table 130m. The data elements received by the client table 130m may or may not be the same as those requested and received by the client table 130a.

Turning to the client table 130a, the processing from FIG. 2 may proceed to block 302, which represents merging the data elements received from the master table into the local client table 130a. For example, the client table 130a may maintain some data that is private or local to the user associated with the client table 130a, and may request some elements of the published data elements to augment the local or private data. Block 302 may thus include integrating the published data elements (e.g., 236 in FIG. 2), as received from the server systems, into any local/private information stored in the client table 130a. Block 302 may also include maintaining any identifier or index information as received with the published data elements, after these data elements are integrated into the client table 130a. As described further below, the identifier or index information may enable tracking of changes made locally within the client table 130a, and may enable reporting these changes back to the server systems and propagating those changes across multiple collaborating client systems.

Block 304 represents applying any local formatting, sorting, filtering, or other local customizations as requested by a local user (e.g., 220). For example, the local user may request that his or her data be presented with certain colors, borders, shading, or the like. In another example, the local user may issue commands to sort the local table in some manner. In yet another example, the local user may issue commands to filter or hide some data in the local table.

Block 306 represents presenting the local table to the user 220, having applied any locally-specified formatting, filters, sorts, or other operations to the local table, and having integrated any master data elements received from the server systems. Block 306 may include highlighting or otherwise indicating the master data elements, so that the local user 220 may readily perceive which data is local and which data is external (i.e., that originated with the server systems or other client systems). FIG. 3 denotes at 308 the local table as presented to the user 220, in response to local specifications 310 (e.g., formatting, sorting, filtering, or similar customizations).

Turning to the other receiving client table 130m and related collaboration services 128m, blocks 312, 314, and 316 correspond to the processing described in blocks 302, 304, and 306, as performed for the other local client table 130m. In particular, block 314 may include formatting, sorting, filtering, or otherwise locally customizing the local client table 130m, in response to local specifications or commands 318 specified by a user 320. FIG. 3 denotes at 322 the local table as presented to the user 320. However, the local specifications 310 for the local client table 130a may differ from the local specifications 318 for the local client table 130m. In this manner, the client systems (more specifically, the services 128a and 128m) may enable different users 220 and 320 to customize their local tables 130a and 130m differently according to their own specifications. For example, the users 220 and 230 may sort or filter their local tables 130a and 130m differently.

As shown by the dashed lines 324 and 326, the local tables 130a and 130m may include at least some master data elements that received from the server systems, with the master data elements being integrated into the local tables. The identifiers may serve to identify and organize the master data elements within the local tables. For ease of illustration, but not to limit possible implementations, the description of the process and data flows 300 are continued into FIG. 4, as indicated by the off-page reference shown in FIG. 3.

Figure 4:
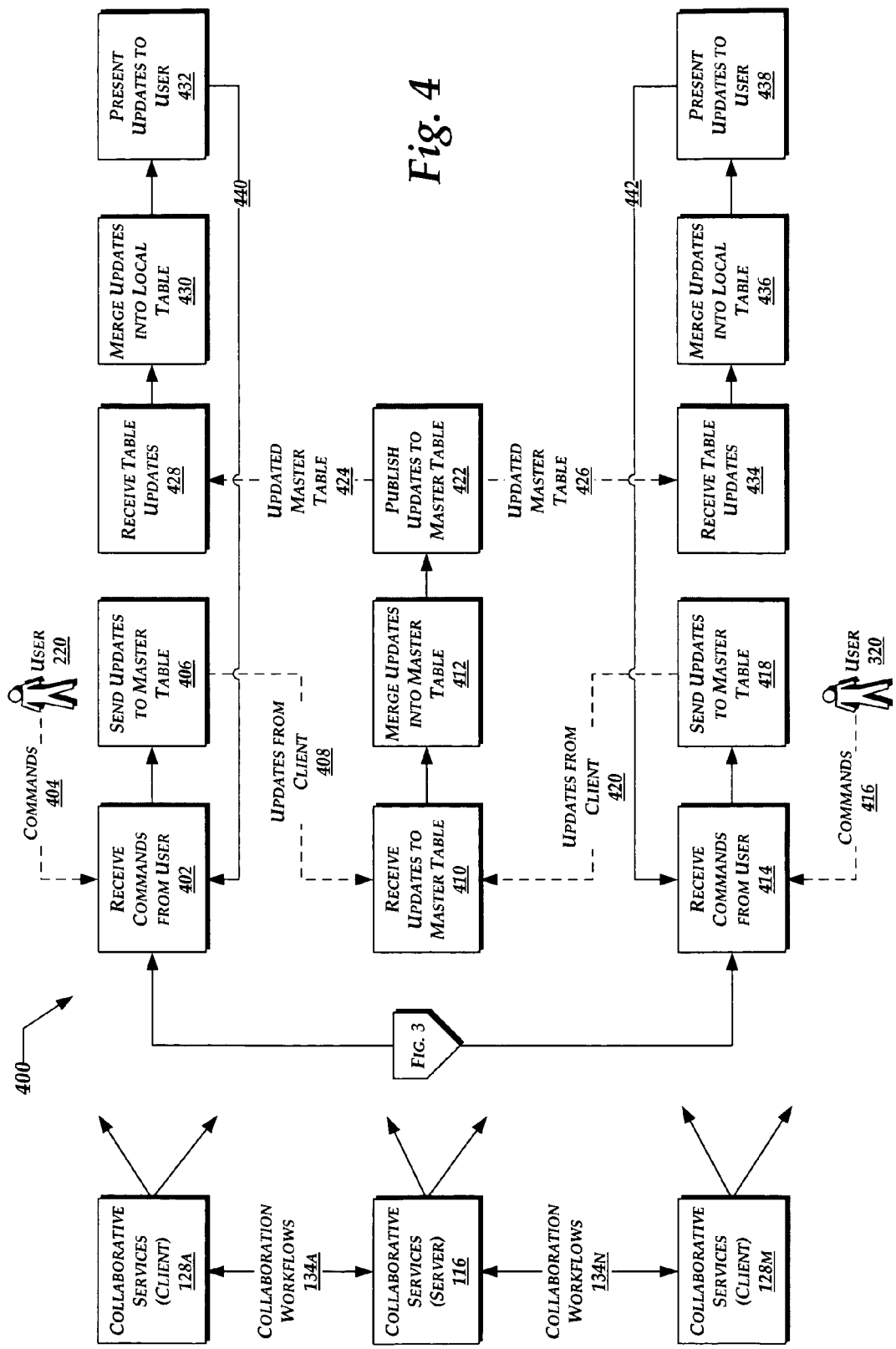
FIG. 4 is a combined block, data, and flow diagram of processes for handling ongoing changes or alterations made to the master table data within different client tables.

FIG. 4 illustrates processes and data flows 400 related to handling ongoing changes or alterations made to master table data within different client tables. FIG. 4 also illustrates integrating those changes or alterations into the master table, and propagating those changes across a variety of different client systems. For ease of description, but not to limit possible implementations, FIG. 4 may carry forward reference numbers from previous drawings, to refer to similar elements.

Beginning at the off-page reference from FIG. 3, block 402 represents receiving one or more commands from a user (e.g., the user 220). These commands may represent, in general, any updates to the client table 130a, whether directed to the local or private data, or to the master data received from the server systems. FIG. 4 denotes these commands generally at 404.

In instances where the user has updated data elements received from the master table, block 406 represents sending updates to the master table data to the server system (e.g., services 116). FIG. 4 denotes these updates at 408, and these updates may reference the identifiers corresponding to the data elements that changed at the client level. The updates 408 may include respective change records, which may include the identifiers, a reference to the column involved, and the new value. Changes may be batched for efficiency. Changes may also be batched when the client is disconnected from the network, or otherwise in an off line mode.

At the server system, block 410 represents receiving the updates 408 to the master table. In turn, block 412 represents merging these updates received from the client systems into the master table. Block 412 may include extracting the identifiers from the updates 408, accessing the portion of the master table (e.g., 118) that corresponds to the indicated identifiers, and updating the appropriate portions of the master table.

Turning to the collaborative services component 128m, this services component may enable another user (e.g., 320) to update a client table (e.g., 130m in FIG. 3) that is managed by this component 128m. More specifically, block 414 represents receiving updating commands from the user 320, with FIG. 4 denoting these commands at 416. In response to the commands 416, the services component 128m may update the client table accordingly. As discussed above with block 402, these updates may include updates to local/private data, as well as updates to master data contained in the client table. In cases where user commands result in changes to master data elements, block 418 represents sending any such updates to the server system to which the master data elements are bound. FIG. 4 denotes these updates at 420.

Returning to the server-side collaboration services 116, block 410 (described above) may include receiving updates from not only from the client services component 128a, but also from the client services component 128m. Put differently, block 410 may include receiving the updates 408 and/or the updates 420, as well as updates from other clients not shown in FIG. 4. In addition, block 412 may include integrating or merging these updates into the master table maintained by the server system. The identifiers may facilitate this integration or merge, by specifying which portions of the master data have been changed by client systems. Aggregated across all client systems, these identifiers would indicate which parts of the master data are to be updated and re-published to clients.

Block 422 represents publishing updates to the master table across the different clients. More specifically, assuming that the client services component 128m changed some master data bound to the server system, block 422 may include publishing these changes or updates to the client services component 128a. Block 422 may also include publishing these changes to any other client systems that have subscribed to this master data. In an HTTP context, block 422 may include the server-side services responding to polling from the clients.

Similarly, if the client services component 128a made changes to some master data that is bound to the server system, then block 422 may include publishing these changes to the client services component 128m and any other client systems that have subscribed to this master data. FIG. 4 denotes at 424 the master table updates that are published to the client services component 128a, and denotes at 426 the master table updates that are published to the client services component 128m. These updates may reference identifiers of the master tables that are affected by particular changes.

At the client services component 128a, block 428 represents receiving the table updates 424, which indicate changes made by other client systems to the master table data. In turn, block 430 represents merging these updates into the local client table (e.g., 130a in FIG. 3). The identifier parameter may facilitate block 430 by enabling the client services component 128a to determine which portions of the master table data to update. Block 432 represents presenting the updated master table data to the user 220. Block 432 may include presenting the updated master table data along with any local or private data maintained by the client system.

Turning to the other client services component 128m, blocks 434, 436, and 438 correspond generally to blocks 428, 430, and 432. Thus, block 434 represents receiving the master table updates 426, block 436 represents merging these updates into the local data display at the client system, and block 438 represents presenting these merged updates to the user of the client system.

At both of the client systems, the client services components 128a and 128m may repeat the blocks shown in FIG. 4 indefinitely, as the users 220 and 320 continue to interact with the data elements presented to them. Thus, the client services component 128a may repeat the blocks 402, 406, 428, 430, and 432 any number of times, as indicated by the arrow 440. Similarly, the client services component 128m may repeat the blocks 414, 418, 434, 436, and 438 any number of times, as indicated by the arrow 442.

In the foregoing manner, multiple client systems may collaboratively access shared data elements (e.g., tables in a spreadsheet). In some cases, multiple clients may access these shared data elements simultaneously. In other cases, some clients may be in an off-line mode, with any changes made while off-line being reconciled the next time the client goes on-line. Updates may occur simultaneously, in sequence with one another, or asynchronously with one another. Any of these clients may update these shared data elements, with updates made by one client being propagated to any other clients sharing the same data elements. The server system may merge and reconcile these updates or changes using the identifiers assigned to the shared data elements. Having described the process flows 200, 300, and 400 in FIGS. 2-4, the discussion now proceeds to a description of operational examples of the foregoing techniques for enabling multi-client collaboration to access and update structured data elements, now presented with FIGS. 5-7.

Figure 5:
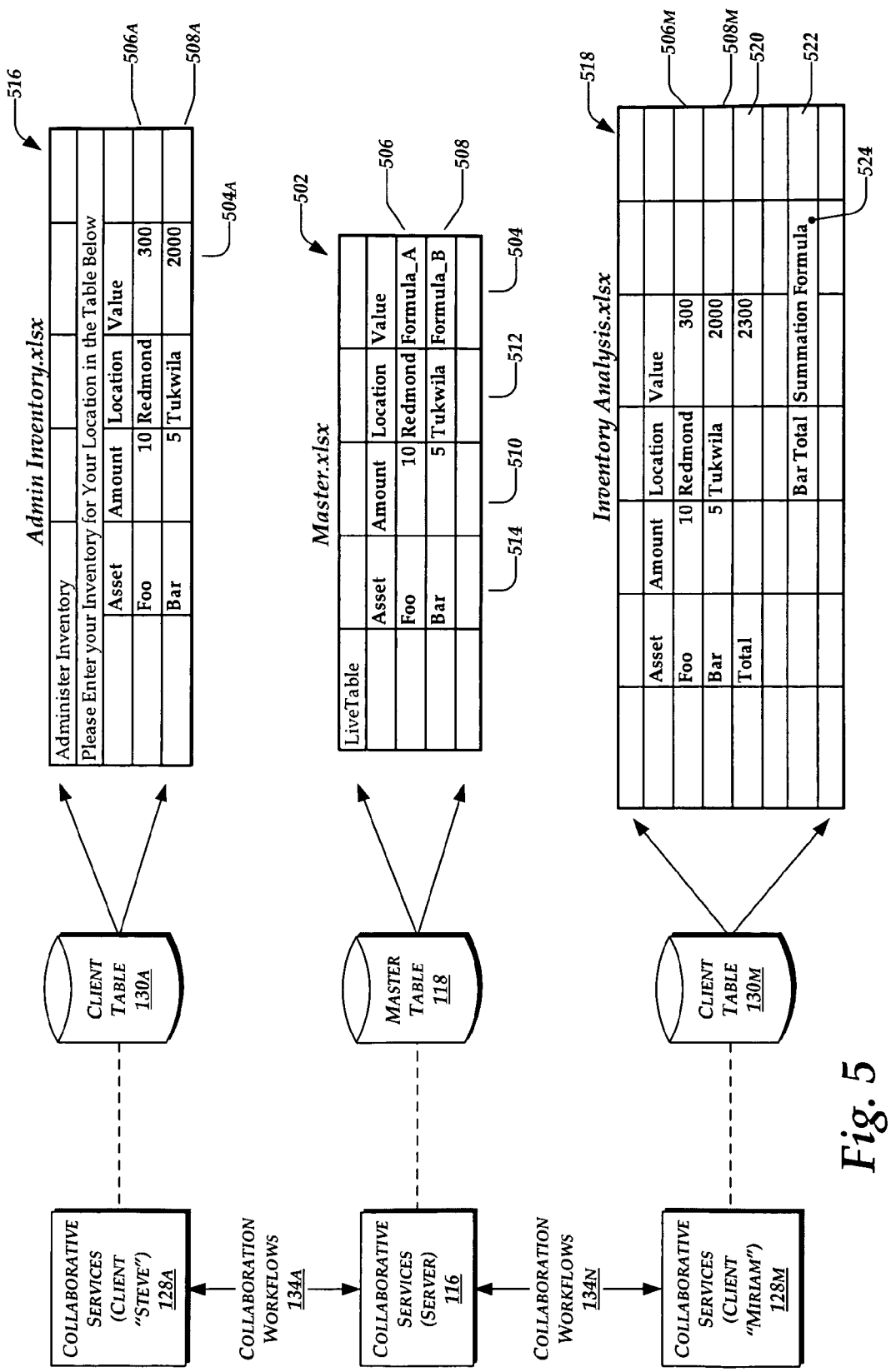
FIG. 5 is a block diagram, illustrating examples of a master table structure shared between two or more client table structures.

FIG. 5 illustrates examples, denoted generally at 500, of a master table structure shared between two or more client table structures. For ease of illustration, but not to limit possible implementations, FIGS. 5-7 may carry forward reference numbers from previous drawings, to refer to similar elements. For example, the client services component 128a may manage the client table 130a, the master services component 116 may manage the master table 118, and the client services component 128m may manage the client table 130m. For ease of reference and description, FIG. 5 illustrates a fictitious user named "Steve" accessing the client table 130a through the collaborative services component 128a, and a fictitious user named "Miriam" accessing the client table 130m through the collaborative services component 128m. For the purposes of describing the examples shown in FIGS. 5-7, but not to limit possible implementations, it is assumed that Steve and Miriam are using spreadsheet-type applications, such as the EXCEL® family of applications available from Microsoft Corporation of Redmond, Wash. In providing these examples, the description herein is not limited to these particular products or versions thereof, but may be implemented in a variety of products and/or versions available from any particular vendors.

FIG. 5 provides an example of the master table 118, termed a "LiveTable" herein, which contains a workbook Master.Xlsx 502 running on a server (e.g., 102 in FIG. 1). The LiveTable 118 may include a calculated (i.e., "Calc") column 504 that performs some calculations based on the rest of the workbook. As described in the examples below, the calc column may contain formulas that compute values based on data residing on the server, and/or data provided by collaborating users like Steve, Miriam, and others. Assuming that the workbook 502 is configured for inventory tracking and management, the workbook may provide information relating to a first item in a row 506, and may provide information relating to a second item in a row 508. The column 510 may provide a number or amount of such items, a column 512 may indicate where these items are located, and a column 514 may name these items. Cells defined by the intersections of these rows and columns provide describe particular instances of the information conveyed by the rows and columns.

Turning to the client table 130a, assuming that the user Steve is an admin, he has opened a workbook 516 named "Admin Inventory.xls", and has imported into the client table 130a at least part of the LiveTable, along with instructions for modifying the data consumed from that LiveTable. Assume, for example, that Steve has received current instances of values in the rows 506 and 508 from the master table. FIG. 5 denotes these imported rows at 506a and 506b, as consumed within the client table 130a. Assume also that Steve has imported the calc column 504 from the master table, as denoted at 504a. The client table 130a contains a calculated value of 300 for the asset "Foo", and a calculated value of 2000 for the asset "Bar", as shown in the column 504a. Generally, the columns in the workbook 516 are arranged according to the columns in the workbook 502.

Turning to the client table 130m, assuming that the user Miriam is an analyst, she opens a workbook 518 named "Inventory Analysis.xls". This workbook 518 may contain at least portions of the LiveTable, with rows 506m and 508m corresponding to the rows 506 and 508 from the master table 118, and the columns of the workbook 518 being arranged generally according to the columns in the workbook 502. The workbook 518 includes and has turned on a row 520 labeled "Total". The row 520 sums the calculated values from a calc column 504m, which corresponds to the calc column 504 in the workbook 502. Miriam's workbook 518 may also include a row 522 that sums the number of "Bar" items, as reported by Miriam, Steve, and any other users who consume data from the master table 118. A cell 524 may define a summation formula used to count the "Bar" items. Having described the initial layouts of the workbooks 502, 516, and 518, the discussion now proceeds to a description of how changes in the shared information is handled, now presented with FIGS. 6 and 7.

Figure 6:
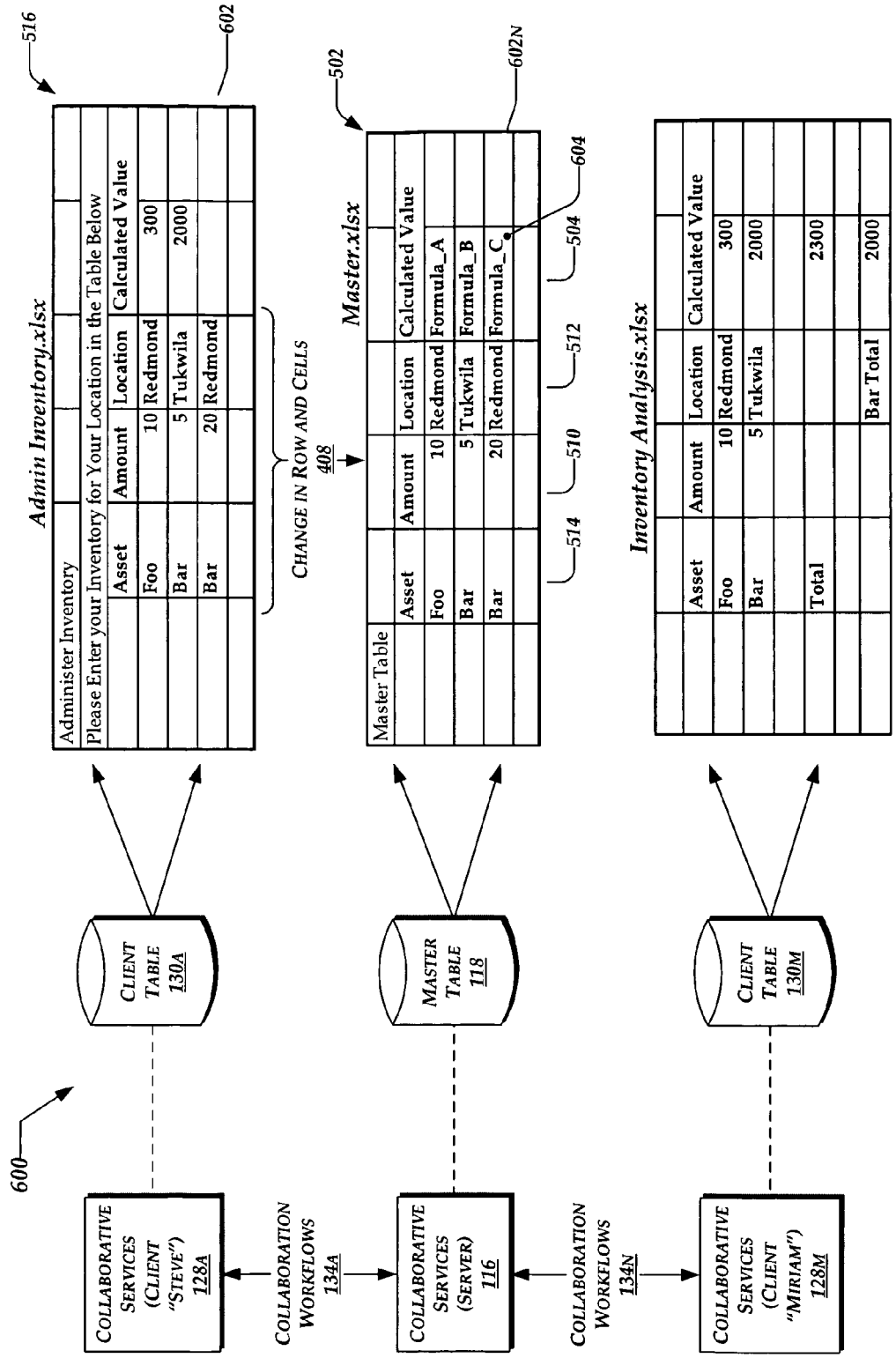
FIG. 6 is a block diagram, illustrating updates that may result when one of the client tables changes data that was consumed from a master table.

FIG. 6 illustrates updates, denoted generally at 600, that may result when one collaborating user updates data that is consumed from a master table. In these examples, the user Steve adds a new row 602 to his workbook 516 (carried forward from FIG. 5). This new row 602 provides additional data for "Bar" items, indicating that 20 of these items are available at a location "Redmond". This update to the workbook 516 provides an example of the data flows 408 illustrated in FIG. 4, by which a client system updates information from the master table. Thus, FIG. 6 carried forward the reference number 408 to label updates to the master table resulting from local changes, in this case changes to rows and cells.

At the master table 118, the collaborative services module 116 receives the updates 408. In response, the workbook 502 adds a new row 602n, and associates it with a value to identify this new row (e.g., a row_id) within the structured data elements shared between different client systems for collaboration. The workbook 502 also updates the columns 510, 512, 514, and 504 for the new row 602n, to incorporate the updates 408. Thus, the master table now indicates that 20 instances of the asset "Bar" are available in Redmond. In addition, a cell 604 within the row 602n includes a new instance of the formula defined within the example calc column 504. Having described how the master table and related workbook 502 may change to incorporate changes from Steve's client workbook 516, the discussion now proceeds to a description of how these changes may be propagated to Steve's and Miriam's workbooks.

Figure 7:
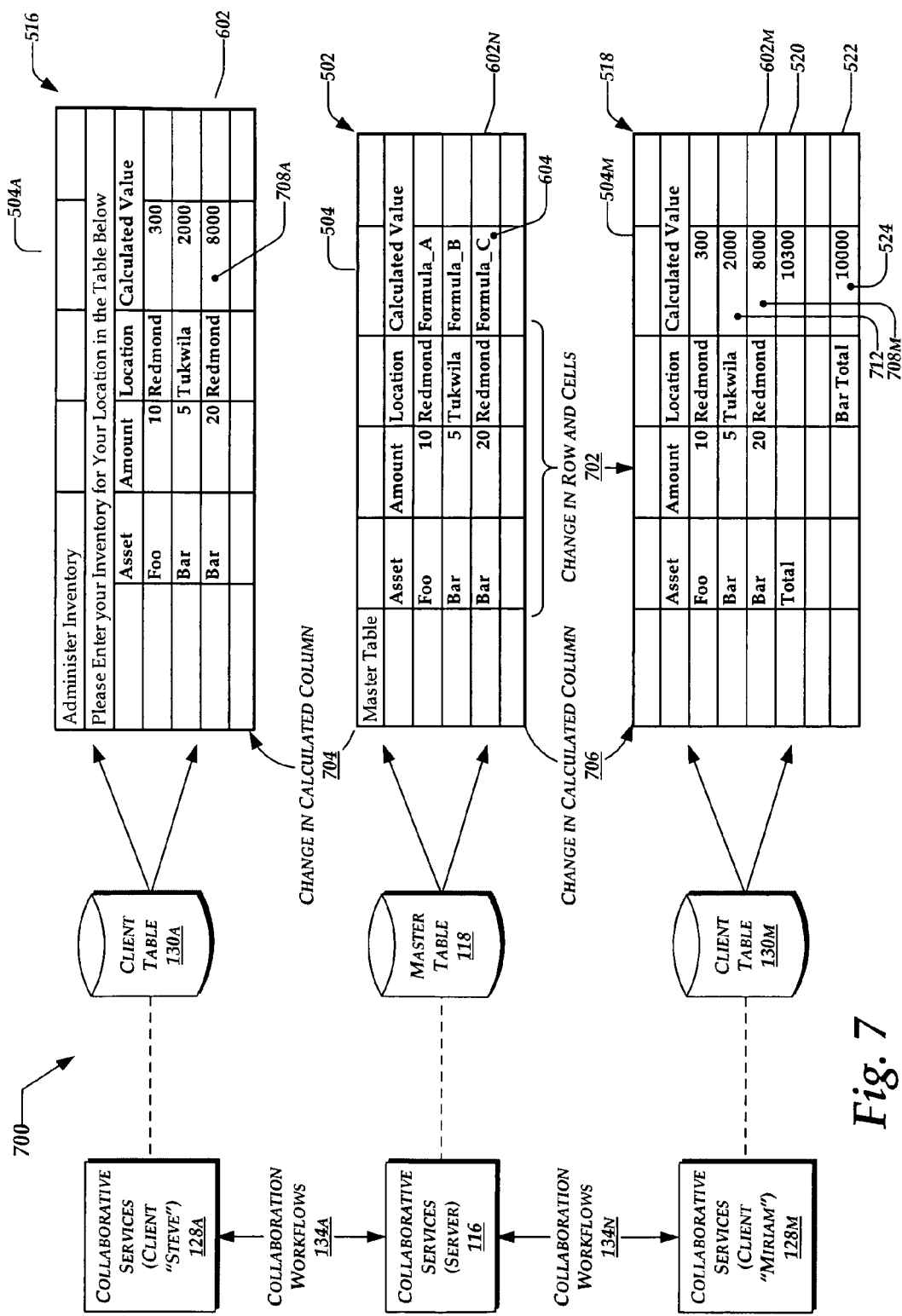
FIG. 7 is a block diagram, illustrating updates that may propagate from the master table because of the updates from one of the client tables.

FIG. 7 illustrates updates, denoted generally at 700, that propagate from the master table because of the updates from one of the client tables. Continuing the above example featuring Steve's and Miriam's local tables, the master table 118 and master worksheet 502 may communicate row/cell changes to Miriam's worksheet 518 that result from changes made to Steve's worksheet 516. FIG. 7 denotes these updates to Miriam's worksheet as row/cell changes 702. Thus, the collaborative service 128m updates Miriam's worksheet 518 with a new row 602m, which corresponds to the rows 602 and 602n, appearing in the other worksheets. More particularly, an identifier (e.g., a row_id parameter) may link or bind Miriam's new row 602m to the corresponding row 602n in the master table and to the corresponding row 602 in Steve's worksheet. In this manner, Miriam's worksheet is updated to reflect the 20 "Bar" items in Redmond.

In addition to updating Miriam with the new rows/cells, the master worksheet 502 also recalculates the calc column 504 in response to Steve's changes, and updates Steve's and Miriam's tables and worksheets with the recalculated values. FIG. 7 denotes at 704 the updates to the calc column as communicated to Steve's worksheet 516, and denotes at 706 the updates to the calc column as communicated to Miriam's worksheet 518. The updates 702, 704, and 706 provide examples of the master table updates 424 and 426 shown in FIG. 4. However, FIG. 7 references these updates with new numbers, to facilitate discussing separately different types of updates to the various client tables.

At Steve's worksheet 516, in response to the update 704, the collaborative service 128a updates the calc column 504a so that a cell 708a contains the calc value computed by the formula in the master table cell 604. In the example shown, the cell 708a contains the value '8000'. At Miriam's worksheet 518, in response to the updates 702 and 704, the collaborative service 128m updates the calc column 504m so that a cell 708m contains the calc value (e.g., '8000') computed by the master table cell 604. Because the calc column now contains a new value (i.e., the '8000' value at 708m), Miriam's row 520 updates locally, as indicated by the updated sum '10300' in cell 710.

Recalling from the description of FIG. 5 that Miriam's table includes a row 522 for summing the calculated values that are attributable to items labeled "Bar". In response to the value of '8000' in the new cell 708m, the cell 524 sums this value with the preexisting value of '2000' in the cell 712, resulting in an updated total of '10000'. Having described the above examples of row and cell changes propagating across multiple collaborating clients, the description now provides more detailed examples of various types of changes.

Operations that add and delete rows may include sending the relevant row_id information for the affected rows. When a client table deletes a row from a shared client table, the client may send a notification with that row_ids to the server. In response, the master table and the other client tables that are bound to the shared client table may perform a table row delete operation on the row that has that row_id.

When a client table inserts or adds a new row at the end of the table, the client table may generate a temporary row_id for the new row. The client table may then send an add row notification to the server, referring to the temporary row_id. The server may generate and return a permanent row_ids that the client table (and other server or client tables) would then use for the new row. The master table and the other client tables bound to it would then add a new row to their tables with the permanent row_ids. The location of the new row within the table may or may not be transmitted. Typically, the new row may appear at the bottom of each table, possibly above if the user is adding a new row at the same time. In some implementations, the new row notification may be withheld at the client until some data is available to send with it to the server.

In at least some implementations, sorts are applied only on the local instance of a client table, for example, in response to local specifications in effect at particular clients (e.g., specifications 310 and 318 in FIG. 3). In this manner, different users may apply their own sorts on their own client tables.

When new rows appear, they may not be sorted immediately, nor is a sort automatically applied when data changes. This approach may prevent the user's location within the affected table from changing under them while they are entering data. Once the edits or insertions are complete, the user may act affirmatively to reapply their sort. The client-side services may provide an always-sort option to the user, such that new data is automatically sorted on arrival. This option may be attractive for clients performing analysis, but not performing data entry.

Client-side services may provide a filtering function, which may behave like a sort. The filtering function may be performed in response to local specifications at particular clients (e.g., 310 and 318 in FIG. 3). Different users may specify their own filters, without affecting other users. Like sorts, filters may be adapted not to cause the location of data to change constantly as the user enters data. An always filter option may have similar value to the always-sort option.

Client-side services may provide a total-row capability, which sums values appearing in one or more columns. This total-row capability may be local to the client table (e.g., in response to local specifications), with users choosing whether to view or see it. Similar considerations may apply to sub-totaling functions.

Different users may choose what table style is applied to their client tables. These table styles may specify particular borders, shading, colors, highlighting, or other visual customizations that are applied locally to client tables displayed to different users. The local customizations applied at one client (e.g., in response to local specifications) would not typically affect displays presented at other clients.

Users may reorder the columns of their client table without affecting the master table. These users may also delete columns as desired, without affecting the master table.

Assuming that a given client table contains one or more calc columns, the client-side services may not allow a user of a client table to edit the calc columns in that client table and push the changes back to the master table, except via a consumer schema change protocol. Outside such protocols, the columns may be treated as read-only.

Where calc columns include dependencies entirely internal to a given table (e.g. multiplying two columns within a table), updates to the calc columns may be pushed down to the client tables from the master table, to give faster feedback and a better experience with offline processing. The master table may provide an option to not push down the formulas for these calc columns, similarly to the features next described for as for calc columns with external dependencies.

Where calc columns include at least one dependency external to a given table, then the consuming client tables would typically not evaluate them. Instead, the server may evaluate these calc columns and push the resulting values down to the consuming client tables. For example, these calc columns may contain proprietary formulas, and this mechanism provides a way to send the client tables values that are calculated using the proprietary formulas, without actually providing or exposing the proprietary formulas. Because only the values within these columns are sent to the clients, rather than the whole workbook recalc, the network volumes are reduced and any local calculations can be done in workbooks consuming the client tables. If a calc column has exceptions and includes external dependencies, then the consuming client tables may be kept unaware of the exceptions, and will receive the calculated values for the exceptions. If the exceptions are in a column that is sent to the consuming client table, then the exception formulas may be sent too.

A client table may add a calc column that only exists in that client table. The client table local calc column may populate such calc columns locally when new rows appear, with the calc columns calculated and maintained locally.

If multiple master tables from the same master workbook are consumed in the same client workbook, then references in the client workbook may be resolved locally at the client, without referring back to the master workbook. Thus, any formulas based on these references may be calculated locally at the client, without incurring the overhead of communicating with the master workbook.

Generally, formatting is applied to different client tables separately. Thus, formatting a cell in a given client table will format only that instance of the client table. Below are some exceptions that may be applied in embodiments:

Number formatting applied to a column in a master table may be made available as part of a schema to all of the consuming client tables to apply on that column.

Block level formats and formats on cells may be propagated to the consuming client tables as the lowest level priority formatting.

Conditional formats evaluated on the master tables may be propagated to the consuming client tables as a priority level above static master formatting.

An option can be enabled on the master table, such that if that option is enabled, then changes that users make to the formatting in the consuming client tables may be transmitted back to the master table and applied there.

The master table may send formatting down to the client tables. In some instances, this formatting may be conditional formatting. In some instances, a particular client may define local specifications (e.g., 310 and 318 in FIG. 3) for formatting at that client. In these instances, a collaborative services module (e.g. 128) at that client may reconcile formatting as sent down from the master table with formatting defined by local specifications at the client.

Tracking based on unique identifiers (e.g., row_ids) within a client table may be maintained while a user is in offline mode. Later, when the user is on-line, the tracking may be reconciled with changes that have since occurred in the master table.

If a user has privileges to open the master workbook, he or she may edit the master table to make schema changes. Examples of such schema changes may include:

Delete column;
   Add column; or
   Change calculated column calculation, or the like When the user commits these changes, the effects of the changes may be applied to all consuming client tables when they next synchronize with the master table.

If users gesture that they wish to change the schema of a master table that they are consuming, then the collaborative services may so permit them, subject to their permissions and the settings on the master table to allow such operations. The client-side services may send the user's local changes to the master table, where they will be applied similar to changing the master table.

The tools and techniques described herein may operate with portal-based collaboration and document management platforms, such as the SHAREPOINT™ platform available from Microsoft, or competing platforms. For example, Lists in SHAREPOINT™ technologies allow the storing and editing of data, and are usable outside of spreadsheet applications. In some instances, these platforms may enable the tools and techniques herein to expose database APIs over a master table to allow use of the APIs by other technologies. In some cases, a List can be bound to a master table, with the List being updated when the master table is changed. With this feature, the List receives updates when the master table is updated, or the master table may receive updates from the List when the List changes. Conflicts may be handled with a UI, in come cases, or with particular marking of the rows.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
   receiving at least one structured data element within a first client spreadsheet at a first client system published at least in part for collaborative access by the first client system and a second client system;
   defining a respective unique identifier that corresponds to the at least one structured data element, the respective unique identifier pointing to row and column values within the first client spreadsheet;
   sending the at least one structured data element and the respective unique identifier to a master table;
   merging the at least one structured data element into the master table based at least in part on the unique identifier;
   calculating a value from the at least one structured data element based on a formula in the master table;
   propagating the at least one structured data element and the calculated value from the master table to a second client spreadsheet at the second client system based at least in part on the respective unique identifier, and binding the propagated at least one structured data element in the second client spreadsheet to a corresponding structured data element in the master table based on the respective unique identifier; and
   propagating the calculated value from the master table to the first client spreadsheet at the first client system based at least in part on the respective unique identifier so that the first client spreadsheet contains the calculated value computed by the formula in the master table.

2. The method of claim 1, wherein sending data includes sending data to the second client system over at least one network.

3. The method of claim 1, further comprising receiving a selection of the at least one structured data element, wherein the selection references the unique identifier corresponding to the at least one structured data element.

4. The method of claim 1, further comprising retrieving the at least one structured data element from a master collection of structured data elements.

5. The method of claim 1, further comprising sending to the second client system representations of a library containing structured data elements, wherein the structured data elements have been published for collaboration by other client systems, and wherein the plurality of structured data elements are associated with respective unique identifiers.

6. The method of claim 1, further comprising receiving at least an update to the at least one structured data element from at least a further client system, wherein the update references the unique identifier for the data element.

7. The method of claim 6, further comprising merging at least the update to the at least one structured data element into the master table, based at least in part on the unique identifier.

8. The method of claim 1, further comprising publishing the update at least to another of the client systems.

9. The method of claim 1, wherein sending the at least one structured data element includes sending at least a portion of a workbook defined within the first client spreadsheet.

10. The method of claim 1, further comprising calculating at least one column in the master table by referring to at least one value received from at least one client table.

11. One of an optical disk, a magnetic storage device or a solid state storage device having computer-executable instructions stored thereupon which, when executed by the computer, cause the computer to:
   receive at least one structured data element within a first client spreadsheet at a first client system published at least in part for collaborative access by the first client system and a second client system;
   define a respective unique identifier that corresponds to the at least one structured data element, the respective unique identifier pointing to row and column values within the first client spreadsheet;
   send the at least one structured data element and the respective unique identifier to a master table;
   merge the at least one structured data element into the master table based at least in part on the unique identifier;
   calculate a value from the at least one structured data element based on a formula in the master table;
   propagate the at least one structured data element and the calculated value from the master table to a second client spreadsheet at the second client system based at least in part on the respective unique identifier, and binding the propagated at least one structured data element in the second client spreadsheet to a corresponding structured data element in the master table based on the respective unique identifier; and
   propagate the calculated value from the master table to the first client spreadsheet at the first client system based at least in part on the respective unique identifier so that the first client spreadsheet contains the calculated value computed by the formula in the master table.

12. An apparatus for multi-client collaboration, the apparatus comprising:
   a central processing unit; and
   a memory storing computer-executable instructions which, when executed by the central processing unit, will cause the apparatus to
   receive at least one structured data element within a first client spreadsheet at a first client system published at least in part for collaborative access by the first client system and a second client system;
   define a respective unique identifier that corresponds to the at least one structured data element, the respective unique identifier pointing to row and column values within the first client spreadsheet;
   send the at least one structured data element and the respective unique identifier to a master table;
   merge the at least one structured data element into the master table that contains at least the data element, based at least in part on the unique identifier;

calculate a value from the at least one structured data element based on a formula in the master table;

propagate the at least one structured data element and the calculated value from the master table to a second client spreadsheet at the second client system based at least in part on the respective unique identifier, and binding the propagated at least one structured data element in the second client spreadsheet to a corresponding structured data element in the master table based on the respective unique identifier;

propagate the calculated value from the master table to the first client spreadsheet at the first client system based at least in part on the respective unique identifier so that the first client spreadsheet contains the calculated value computed by the formula in the master table;

receive at least a further update to the data element from at least a further client system, wherein the further update references the unique identifier for the data element; and merge at least the further update to the data element into the master table, based at least in part on the unique identifier.

13. The method of claim 1, further comprising:

receiving a request to edit the master table to make changes to a schema of the master table, the changes comprising one or more of adding a column to the master table, deleting a column from the master table, and changing the calculation of a calculated column;

in response to receiving the request to edit the master table, determining if a user making the request to edit the master table has privileges to edit the master table; and in response to determining that the user has privileges to edit the master table, receiving the changes to the schema of the master table, applying the changes to the schema of the master table, and synchronizing the changes to the schema of the master table to the first and second client systems.

14. The optical disk, magnetic storage device or solid state storage device of claim 11, wherein the computer-executable instructions stored thereupon which, when executed by the computer, further cause the computer to:

receive a request to edit the master table to make changes to a schema of the master table, the changes comprising one or more of adding a column to the master table, deleting a column from the master table, and changing the calculation of a calculated column;

in response to receiving the request to edit the master table, determine if a user making the request to edit the master table has privileges to edit the master table; and in response to determining that the user has privileges to edit the master table, receive the changes to the schema of the master table, apply the changes to the schema of the master table, and synchronize the changes to the schema of the master table to the first and second client systems.

15. The apparatus for multi-client collaboration of claim 12, the computer-executable instructions which, when executed by the central processing unit, will further cause the apparatus to:

receive a request to edit the master table to make schema changes;

in response to receiving the request to edit the master table, determine if a user making the request to edit the master table has privileges to edit the master table; and in response to determining that the user has privileges to edit the master table, receive the schema changes to the master table, apply the schema changes to the master table, and synchronize the schema changes to the master table to the first client system, the second client system, and the further client system, wherein the schema changes comprise one or more of adding a column to the master table, deleting a column from the master table, and changing the calculation of a calculated column.

\* \* \* \* \*